May 18, 1965 E. R. SLATER 3,183,553
CRAMMER FEEDER FOR EXTRUDER
Filed Nov. 10, 1961
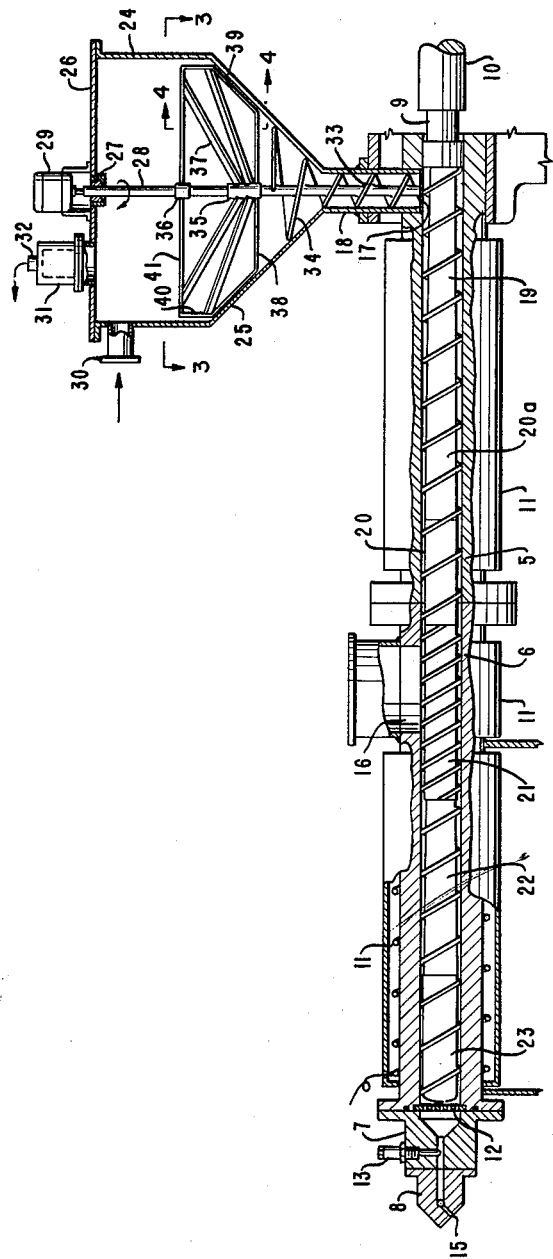
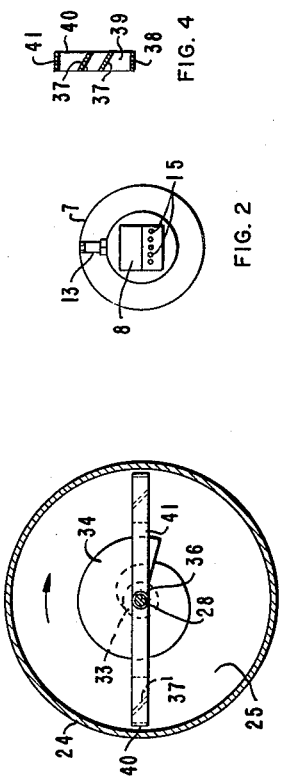
INVENTOR:
ERNEST R. SLATER
BY: *Oswald H Milmore*
HIS ATTORNEY United States Patent Office 3,183,553
Patented May 18, 1965

3,183,553
CRAMMER FEEDER FOR EXTRUDER
Ernest R. Slater, Berkeley, Calif., assignor to Shell Oil Company, New York, N.Y., a corporation of Delaware
Filed Nov. 10, 1961, Ser. No. 151,467
3 Claims. (Cl. 18—12)

The invention relates to devices for feeding powdered materials, particularly those of low bulk density, into an extruder barrel for compaction therein.

Extruders (sometimes called screw presses) of the type herein considered include a cylindrical or tapered barrel having a restricted discharge orifice at one end and a rotatable feed screw mounted within the barrel and constructed to force powdered material through the barrel. Because of the resistance of the orifice the powder is compressed and, in the case of thermo-plastic materials, e.g., polymers of monomeric alkylenes, such as polyethylene and polypropylene, melted due to the heat developed from the work required to build up the pressure as well and, in some cases, supplemented by heat transferred through the barrel from external heating means.

Difficulty has been encountered in feeding powdered material of low bulk density to such extruders, particularly when such material is not free-flowing, and recourse has been had to pelletizing the powdered material to facilitate feeding. Apart from the inconvenience of resorting to the added operation of pelletizing the powder, this becomes objectionable when it is necessary for other reasons to handle such material in the condition of low bulk density as when mixing thereof with other powdered material, such as coloring agents, is desired.

It is the object of the invention to promote the flow of powdered material having a low bulk density into the barrel of an extruder.

Further objects are to provide an improved crammer feeder for feeding such powdered material from a hopper into the said barrel; and to provide a crammer feeder wherein mixing powdered materials can be effected, to promote the homogeneity of the powdered material fed to the screw press, both when similar material from different sources is supplied, and/or the material includes particles of a wide range of sizes among which segregation would be detrimental, and/or when additives, such as coloring agents, are to be dispersed therein.

In summary, the crammer feeder according to the invention includes a hopper having a tubular discharge spout which is adapted to be connected to the barrel of the extruder to supply powder thereto under positive pressure, said spout containing an auger having a shaft extending upwards from the auger and carrying agitating blades which promote flow of the powdered material into the auger and for effecting intimate mixing of the powdered material. The said blades are, in the preferred embodiment, inclined to the vertical radial plane through the shaft, so as to function like fan blades to tumble the powdered material by lifting it and letting it fall and thereby effect both mixing and causing the material to enter the flights of the auger upon falling. The hopper may have a top closure and a gas outlet having a filter for discharging gas.

The term "powder," as used herein, denotes finely subdivided solid material having diameters from about 2 to about 1,000 microns. The invention will be described as applied to the compaction of thermo-plastic material, particularly polyolefins, having particle diameters distributed throughout the range of from 5 to 500 microns.

The invention will be further described with reference to the accompanying drawing forming a part of this specification and showing one preferred embodiment thereof, wherein:

FIGURE 1 is a vertical longitudinal sectional view through the extruder and crammer feeder;
FIGURE 2 is an end view of the extruder; and
FIGURES 3 and 4 are sectional views taken on the lines 3—3 and 4—4, respectively, of FIGURE 1, showing the blade arrangement.

Referring to the drawings in detail, the extruder includes a barrel including rear and front tubular sections 5 and 6, a restricted discharge orifice device including bored sections 7 and 8, and within the barrel, a rotatable screw 9 having a drive end 10 which extends out of the barrel for connection to suitable drive means. Electrical heating elements 11 surround the barrel along the length thereof. The orifice device includes a screen pack 12, consisting of layers of wire mesh screens, fitted to strain out impurities such as dirt, and a die valve 13 for increasing the backpressure and reduce surging. The section 8 is a die and has a plurality of outlet passages 15. The front barrel section 6 has a vent opening 16 through which volatiles can be discharged. The rear section 5 has a lateral inlet opening 17 through which the powdered material is admitted from the spout 18 of the feeder device to be described.

The screw 9 includes a rear section 19–20, an intermediate section 21 and a front section 22–23. The rear section is shaped to provide a gradually decreasing flight depth throughout most of its length 19, for compressing the powdered material and the front part 20, thereof has a uniform flight depth to meter the flow of solids. The intermediate section has a constant flight depth and uses a two-start thread. The front section has, throughout most of its length 22, flights of decreasing depth, and the front part 23 has uniform flight depth to meter the flow.

Athough a specific extruder or screw press having a cylindrical barrel was described, no claim for invention in the press per se is made, and it is to be understood that the invention is not restricted thereto. Screw presses of various types being well known, further details of the press are not described herein.

The feed device includes a hopper 24 having a frusto-conical bottom 25 to the central opening of which the tubular spout 18 is fitted. The hopper has a top closure 26 having a bearing 27 for a vertical drive shaft 28 which extends upwards through the closure. The shaft is driven rotatably by a suitable drive mechanism 29 which is advantageously capable of operating at a variable speed. The hopper further has an inlet 30 and a filter box 31 provided with a vent 32 to which suction can be applied to draw off gas and thereby facilitate influx of the powdered material through the inlet 30.

The shaft 28 carries an auger or screw 33 which includes an upper part 34 situated above the spout throughout several flights and enlarged radially and shaped to sweep the lower part of the frusto-conical hopper bottom 25. Fitted to the shaft above the auger for rotation therewith by collars 35, 36, is a plurality of, e.g., four, agitator blades 37. The blades may be narrow strips of metal arranged in tiers, as shown, and are inclined upwards outwardly from the collar 35 to a support frame, also made of strip metal, which includes horizontal parts 38 extending out from the collar 35, inclined parts 39 and vertical parts 40 which sweep the bottom 25 above the auger and the lower part of the cylindrical hopper 24, respectively, and horizontal parts 41 which are fast to the collar 36. Each blade is tilted at an inclination to the vertical radial plane through the shaft, typically 30° to the horizontal as shown in FIGURE 4, so as to have the action of a propeller to lift powder when the blades are rotating. Only a limited number of tiers of blades is used, to avoid excessive agitation and provide a large, vertically unobstructed space.

In operation, powdered material, e.g., polypropylene having a bulk density of about 12 lbs. per cubic foot and particle diameters distributed throughout the range of 5 to 500 microns, together with a small amount, e.g., 2% by weight of a mastermix consisting of equal parts by weight of the said powder and a pigment, is charged at 30 by applying suction at 32. Feed may be continuous or intermittent. The shaft 28 is driven at a speed of 10 to 60 r.p.m. to agitate the powder and effect an intimate mixture of the mastermix containing the pigment and the other powdered polypropylene. The blades 37 elevate the powder within the hopper, causing it to tumble downwards; they also move the powder toward the central axis. These motions result in the dual effects of mixing and feeding the powder into the auger 33. The blade parts 39 and 40 further aid to prevent arching. The polypropylene powder is not free-flowing and tends, without these blades, to bridge or adhere to the walls of the hopper; this was found to cause slow and irragular entry of the powder into the auger. By the use of the blades this tendency was effectively overcome and excellent, uniform flow of the powder was achieved.

The auger forces the powder into the opening 17 of the extruder barrel is slightly compacted form. In this state the powder is not compressed sufficiently to cause fusion but compaction is adquate to insure steady flow of the powder into the flights of the screw 9, which is rotated.

In the extruder the powder is compressed principally in the rear section 19 and is melted due to the heat developed from the work of compression and to heat which flows from the heaters 11. The front part 20 of this screw section, of uniform flight depth, acts as a metering section. The material passes thence along the intermediate section 21, past the vent opening 16, through which volatile constituents escape. The material is then re-compressed in the front section 22 and again metered in the front part 23, being further heated by work of compression and from the heaters 11. The molten material flows through the screen pack 12, past the pressure-regulating die valve 13, and the die 8, from which it is expressed as strands suitable for cutting into fused pellets after discharge from the opening 15.

It is evident that the feeder, consisting of parts 18 and 24-41, crams the powder into the barrel 9 to insure effective feeding into the latter. It was found that low-density powder which is not free-flowing, such as that described, could not be fed into such a barrel at uniform rates nor at sufficient speed without such a crammer feeder, resulting not only in low throughput but in non-uniform quality due to sporadic interruptions in feeding. It was further found that the powder charged to the barrel is uniform, i.e., that there is not tendency toward segregation on the basis of particle sizes, and that a pigment powder mastermix is uniformly distributed.

I claim as my invention:
1. A crammer feeder for feeding powdered solid materials under pressure to the barrel of an extruder and to mix said materials before movement to said barrel, said feeder comprising:
   (a) a feed hopper having a bottom carrying a tubular discharge spout adapted to be connected to said extruder barrel,
   (b) an auger within said spout having threads for forcing powder downwards from the hopper and having a drive shaft extending upwards through the hopper, and
   (c) mixing blades on and rotatable with said shaft extending radially outwardly therefrom near to the said bottom so as to sweep at least a part thereof, said blades having narrow widths to leave larger circumferentially contiguous open spaces and being inclined with respect to the vertical radial plane through the shaft in a direction opposite to said threads to lift said powdered materials during rotation of the shaft in a direction in which the auger forces powder downwards and effect mixing of said materials within the hopper.
2. A crammer feeder as defined in claim 1 wherein said mixing blades are arranged in vertical tiers, there being at least two tiers, said blades being formed of narrow strips and extending upwardly form said shaft.
3. A crammer feeder as defined in claim 1 wherein:
   (a) said hopper bottom has a frusto-conical shape, and
   (b) said auger has an upper part which is situated above the spout throughout several flights of the auger and is radially enlarged, the bottom of said upper part being shaped frusto-conically to sweep the lower part of said frusto-conical bottom.

References Cited by the Examiner
UNITED STATES PATENTS

| | | | |
|---|---|---|---|
| 266,700 | 10/82 | Langlois | 222—242 |
| 682,390 | 9/01 | Schrader | 18—12 |
| 1,361,346 | 12/20 | Nichols | 18—12 |
| 2,011,055 | 8/35 | Klugh | 18—12 |
| 2,369,359 | 2/45 | MacWilliam et al. | 18—12 |
| 2,370,469 | 2/45 | Johnson et al. | 18—12 |
| 2,384,521 | 9/45 | Anderson et al. | 18—55 |
| 2,541,201 | 2/51 | Buecken et al. | 18—55 |
| 2,604,659 | 7/52 | Eppler | 18—12 |
| 2,690,634 | 10/54 | Ketchpel et al. | 198—64 XR |
| 2,791,802 | 5/57 | Weber | 18—12 |
| 3,008,184 | 11/61 | Fritsch | 18—12 |
| 3,047,034 | 7/62 | Sassmannhausen et al. | 222—24 |

FOREIGN PATENTS

| | | |
|---|---|---|
| 85,219 | 3/58 | Denmark. |
| 351,755 | 3/61 | Switzerland. |

MICHAEL V. BRINDISI, *Primary Examiner.*

ROBERT F. WHITE, *Examiner.*